(12) United States Patent
Edler

(10) Patent No.: US 7,476,061 B2
(45) Date of Patent: Jan. 13, 2009

(54) TURNING TOOL AND AN INDEXABLE TURNING INSERT, AS WELL AS AN ATTACHMENT FOR SUCH TURNING TOOLS

(75) Inventor: Daniel Edler, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/475,257

(22) Filed: Jun. 27, 2006

(65) Prior Publication Data

US 2007/0009334 A1    Jan. 11, 2007

(30) Foreign Application Priority Data

Jun. 27, 2005   (SE)  ................................. 0501514

(51) Int. Cl.
*B26D 1/00*   (2006.01)
*B26D 7/00*   (2006.01)
(52) U.S. Cl. ........................................ 407/66; 407/113
(58) Field of Classification Search ......... 407/113–117, 407/107, 66.67
See application file for complete search history.

(56) References Cited

U.S. PATENT DOCUMENTS

| | | | |
|---|---|---|---|
| 5,863,162 A | 1/1999 | Karlsson et al. | |
| 5,888,029 A | 3/1999 | Boianjiu | |
| 6,991,410 B2 * | 1/2006 | Andras et al. | ............... 407/107 |
| 7,121,771 B2 * | 10/2006 | Englund | ..................... 407/103 |
| 2004/0057785 A1 | 3/2004 | Blucher et al. | |
| 2005/0079019 A1 | 4/2005 | Andras et al. | |
| 2005/0232710 A1 | 10/2005 | Schafer et al. | |

FOREIGN PATENT DOCUMENTS

| | | |
|---|---|---|
| DE | 34 48 086 | 1/1984 |
| DE | 3402547 A1 | 8/1985 |
| EP | 0 037 691 A | 10/1981 |
| WO | 98/30349 A | 7/1998 |
| WO | 03/097281 | 11/2003 |
| WO | 03/097282 | 11/2003 |

OTHER PUBLICATIONS

International Preliminary Report on Patentability mailed Jan. 17, 2008 issued in PCT Application No. PCT/SE2006/000749.
Supplementary European Search Report dated Jul. 8, 2008 issued in European Application No. 06 75 7990.4.

* cited by examiner

*Primary Examiner*—Willmon Fridie
(74) *Attorney, Agent, or Firm*—Drinker Biddle & Reath LLP

(57) ABSTRACT

An indexable turning insert, which has a symmetrical, preferably rotationally symmetrical basic shape, that is determined by a clearance surface extending between a top side and an underside, and which includes a cutting edge as well as a coupling device located to the underside. The coupling device comprises at least two, preferably three, suitably equiangularly spaced-apart engagement members, preferably in the form of ridges, emanating radially from a center axis and having a pair of flanks that mutually form an obtuse angle. A turning tool and an attachment for the same is also disclosed.

28 Claims, 5 Drawing Sheets

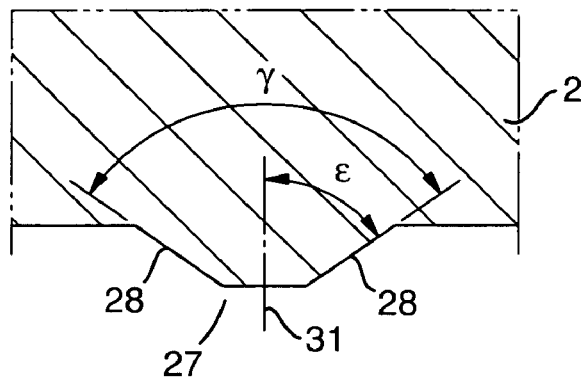
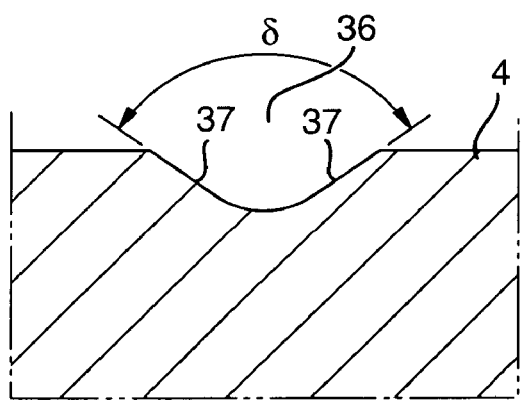
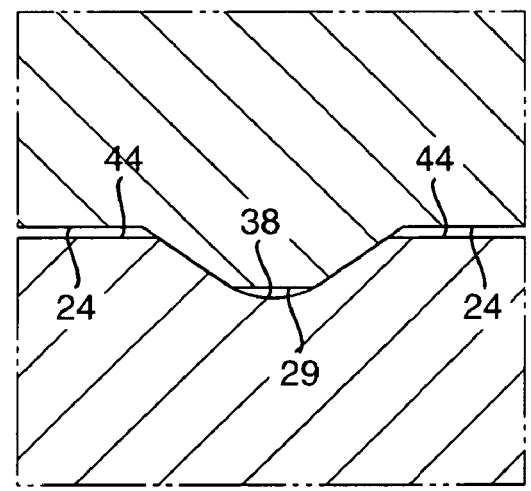
*Fig 7*        *Fig 8*

TURNING TOOL AND AN INDEXABLE TURNING INSERT, AS WELL AS AN ATTACHMENT FOR SUCH TURNING TOOLS

FIELD OF THE INVENTION

The present invention generally relates to a turning tool of the type that comprises a basic body having an insert seat defined by a center axis, and a turning insert detachably mounted in the seat, which insert is indexable and has, around the center axis, a symmetrical basic shape that is determined by a clearance surface extending between a top side and an underside, and which includes a chip-removing cutting edge adjacent to the top side as well as a coupling element formed in the underside, which element includes an elongate engagement member having a pair of spaced-apart flanks, which—as viewed in cross-section—are inclined while forming an angle with each other, the coupling element of the turning insert mechanically engaging a complementary coupling element in the insert seat of the basic body. More particularly, the present invention pertains to a turning insert as well as an attachment for such turning tools.

BACKGROUND DISCUSSION

The problems and needs that form the basis of the present invention are primarily—but not exclusively—related to such turning tools that make use of round turning inserts. Such turning inserts have a basic shape that is determined by a rotationally symmetrical clearance surface around a central axis, which may be conical as well as cylindrical, and extends between, on one hand, a top side or chip surface, and on the other hand an underside. In the transition between the chip surface and the clearance surface, there is a cutting edge that is endless and circular. During operation, only a certain part of the cutting edge is in engagement with the workpiece, viz. the arc part that, depending on the diameter of the turning insert and the cutting depth in question, generates a cut surface in the workpiece. In other words, the arc length of the active edge part is small when the cutting depth is small, and greater when the cutting depth is greater.

The round turning inserts of the prior art had a simple, planar underside and were fixed in an insert seat having a planar bottom and a rear, round support surface against which a rear part of the clearance surface could be pressed. Recently, round turning inserts have been developed, which on the underside thereof have a coupling element in the form of a single, cross section-wise V-shaped engagement member (being the lower material portion in the turning insert), which engages an analogously cross section-wise V-shaped seating in the insert seat of the basic body of the tool. Although such turning inserts, in theory, give a more stable fixation than the simpler, older turning inserts, in practice, the same are associated with disadvantages. One such disadvantage is that the desired stability improvement is of a theoretical character. Hence, an exceptionally high accuracy is required for the two V-shapedly inclined male flanks of the turning insert, as well as the complementary female flanks in the insert seat, in order for the male flanks of the turning insert to be pressed in close surface contact against the female flanks. In this connection, it should be pointed out that the turning inserts and the basic body of the tool are manufactured on different sites and from different materials. While the turning inserts are manufactured from extremely hard, usually compression-molded and sintered materials, such as cemented carbide, ceramics, cement or the like, the basic body is manufactured from a softer material, usually steel. In the manufacture of, in particular, the turning inserts, form defects may arise, which usually are utmost small, for example of the order of a few thousandths of a millimeter, but which in practice means that the two male flanks of the turning insert do not get complete surface contact with the two female flanks of the insert seat. In other words, the turning insert will wobble or be over-determined in the insert seat.

Another disadvantage of the known turning inserts is that the same only can be indexed into two positions, viz. by being rotated 180° in such a way that two diametrically opposed edge portions having a limited arc length become active. Frequently, the turning inserts are used only for small cutting depths. This means that only two very short edge portions become worn, while great parts of the endless edge as to the rest remain unutilized. Thus, it may occur that the turning inserts are worn only along 90° of the circumference thereof, while 270° remain unutilized.

When the turning inserts are small (the diameter <15 mm) and the insert-carrying part of the basic body is comparatively weak, there is furthermore a certain risk that the wedge-shaped bottom part of the turning insert tends to crack or cleave the insert seat, because the cutting forces principally propagate axially through the turning insert.

In DE 3448086 C2, a tool intended for turning, more precisely internal turning, is disclosed, which is composed of a elongate, shaft-like basic body and a replaceable insert body, which is possible to fix in an insert seat of the basic body by way of a tightening screw. The insert body is ring-shaped and has at least one radially projecting nose on which an operative cutting edge is formed. This means that the most straining force from the workpiece, viz. the tangential force, is applied to the nose, the same aiming at rotating the ring body around the center axis of the tool. The turning insert and the insert seat include co-operating coupling elements in the form of three equidistantly spaced-apart ridges on the insert body and the same number of recesses or grooves in the insert seat, which is located in an end surface of the elongate basic body. Each ridge as well as each recess includes a pair of oblique flanks. However, in this case, the angle between the flanks of each pair of flanks is acute (according to the example, approx. 45°) in order to, in the best way, counteract rotation of the insert body in relation to the insert seat. This means that the coupling elements are absolutely unsuitable to carry axial forces of any importance. In other words, it would not be possible to successfully use the described coupling elements for the transfer of considerable, axially acting cutting forces from a turning insert to an insert seat. Another aggravating drawback of the known turning tool is that the insert body in question is ring-shaped in order to allow the passage of a front-mounted tightening screw. This means that the insert body is considerably weakened due to the central hole, something that in practice precludes a realization of the insert body in the form of a turning insert having a small diameter. In this context, it should also be pointed out that the insert body according to DE 3448086 C2 does not have any endless cutting edge at all.

Coupling elements that include three equiangularly arranged ridges and grooves, respectively, are further known by WO 03/097281 and WO 03/097282. However, also in these cases, the coupling elements have the purpose of providing a rotary locking between an insert body and a basic body, and therefore the angle between the flanks of each associated pair of flanks is acute.

What is more, because the tool is a milling cutter, i.e., a tool the basic body of which rotates during the chip removing machining, the flanks are asymmetrically arranged with the purpose of carrying unidirected rotary motions.

SUMMARY

The present invention aims at obviating the above-mentioned disadvantages and at providing an improved turning tool having an improved turning insert. Therefore, a primary object of the invention is to provide a turning tool the turning insert of which can be indexed a large number of times with the purpose of utilizing the chip-removing edge of the turning insert in an optimal way. An additional object is to provide a turning tool, the turning insert of which can be manufactured with moderate requirements of precision and in spite of this be rigidly fixed in the appurtenant insert seat in the basic body of the tool. Furthermore, in the mounted state thereof, the turning insert should be able to carry considerable tangential forces arising from the rotating workpiece, which act substantially axially on the turning insert, without detriment neither to the turning insert nor to the appurtenant insert seat. Yet an object of the invention is to allow the use of extraordinary small, round turning inserts having a good strength and a long service life.

The invention is based on the intention to make the co-operating coupling elements of the turning insert and of the insert seat in the form of, on one hand, three radially emanating and equiangularly spaced-apart engagement members in one of the coupling elements, and on the other hand at least two radially emanating engagement members in the other coupling elements, which engagement members form the same angle as two of the three engagement members of the one of the coupling elements, the engagement members individually being delimited by flanks, which form an obtuse angle with each other. The invention is, in the most preferred embodiment thereof, realized by way of three ridges on the underside of the turning insert and at least three, suitably six grooves in the insert seat. In such a way, the turning insert can be indexed into at least three, or alternatively six different positions. Therefore, upon small or moderate cutting depths—in the last-mentioned case—the edge of the turning insert can be utilized along the major part of the circumference, more precisely by the utilization of six different part edges having a limited arc length. By the fact that the angle between the male flanks of the ridges and the female flanks of the grooves is obtuse, it is further gained that the cutting forces acting against the top side of the turning insert are carried by great support surfaces, in that the projection surfaces of the flanks in the axial direction become maximally great.

According to a first aspect, a turning tool comprises a basic body having an insert seat defined by a center axis. A turning insert is detachably mountable in the insert seat. The turning insert is indexable and has, about the center axis, a symmetrical basic shape that is determined by a clearance surface extending between a top side and an underside. The turning insert includes a chip-removing cutting edge adjacent to the top side. Coupling elements are formed in the underside. The coupling elements include an elongate engagement member having a pair of spaced-apart flanks, which as viewed in cross-section along the engagement member, are inclined while forming an angle with each other. The coupling elements of the turning insert mechanically engage a complementary coupling element that forms the insert seat of the basic body. One of the two coupling elements comprises three equiangularly spaced-apart engagement members emanating radially from the center axis and the other of the two coupling elements comprises at least two engagement members emanating radially from the center axis and forming the same angle as two of the three engagement members of the one of the coupling elements, wherein pairs of flanks of the engagement members form an obtuse angle with each other.

According to a second aspect, an indexable turning insert comprises a symmetrical basic shape around a center axis that is defined by a clearance surface extending between a top side and an underside. A chip-removing cutting edge is disposed adjacent to the top side. Coupling elements are located to the underside. The coupling elements comprise an elongate engagement member having a pair of spaced-apart flanks, which as viewed in cross-section along the engagement member are inclined while forming an angle with each other, wherein the coupling element comprises at least two engagement members emanating radially from the center axis and forming an angle different from 180°. Pairs of flanks of the engagement members form an obtuse angle with each other.

According to a third aspect, an attachment for a turning tool comprises a coupling element being formed in the turning tool. The coupling element forms an insert seat and includes an elongate engagement member having a pair of spaced-apart flanks, which as viewed in arbitrary cross sections along the engagement member, are inclined while forming an angle with each other. The coupling element comprises at least two engagement members emanating radially from a center axis and forming an angle different from 180°. Pairs of flanks of the members form an obtuse angle with each other.

BRIEF DESCRIPTION OF THE FIGURES

The accompanying drawings provide visual representations which will be used to more fully describe the representative embodiments disclosed herein and can be used by those skilled in the art to better understand them and their inherent advantages. In these drawings, like reference numerals identify corresponding elements and:

FIG. 7 is a further enlarged exploded view showing the geometry of a ridge formed on the underside of the turning insert, and a groove of the insert seat co-operating with this ridge, FIG. 8 is a detailed section showing the ridge in engagement with the groove.

DETAILED DESCRIPTION

Figure 1:
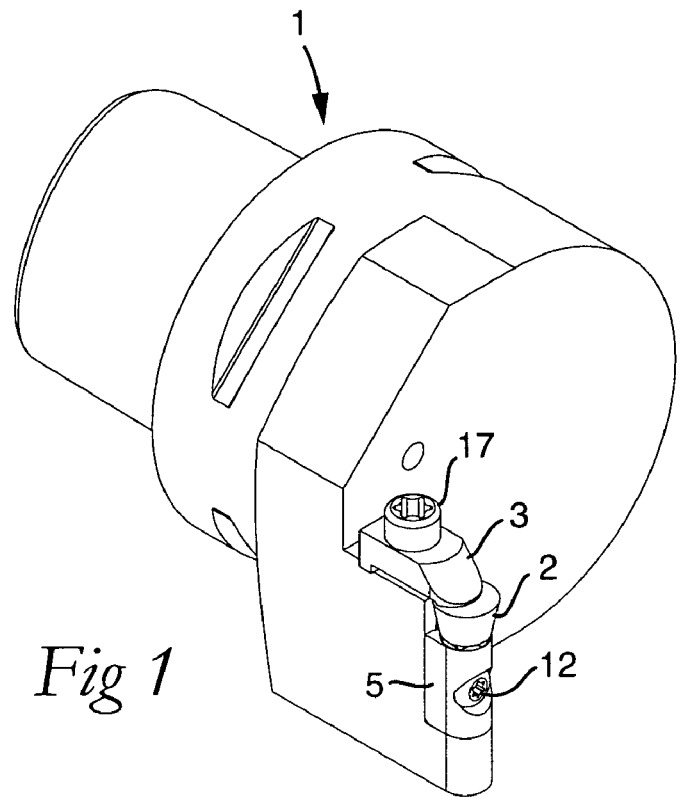
FIG. 1 is a perspective view of a turning tool according to the invention.
Figure 2:
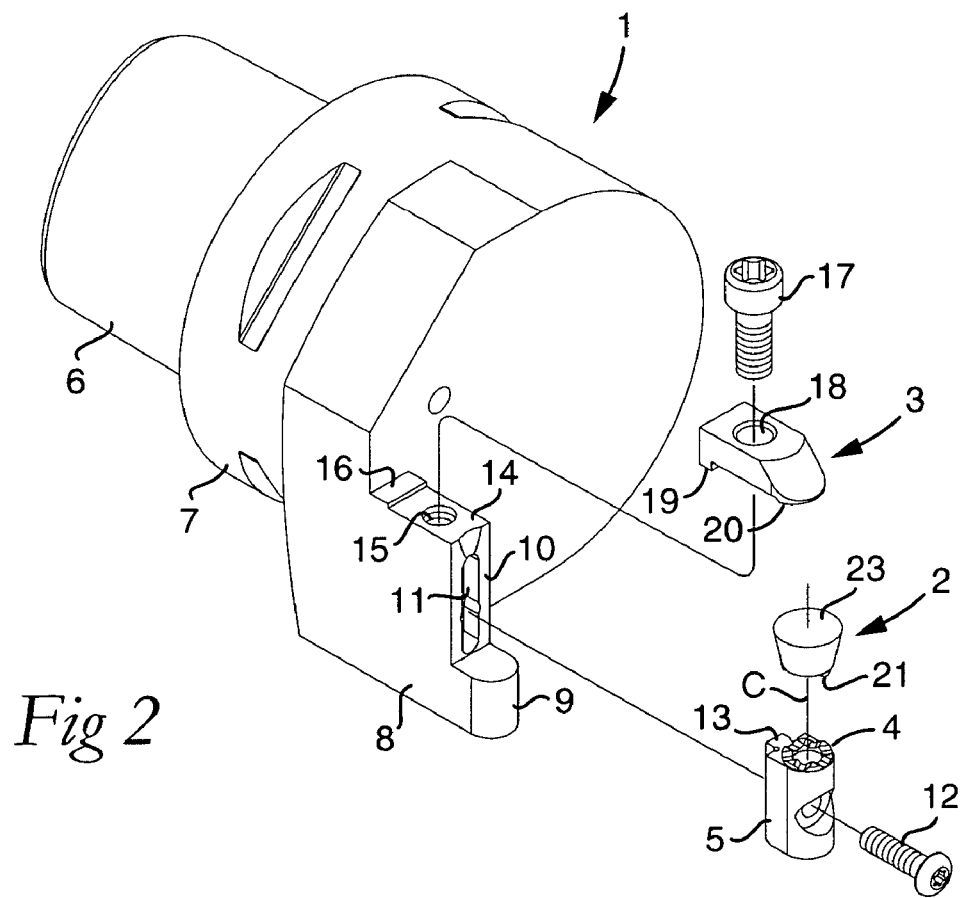
FIG. 2 is a perspective exploded view showing a turning insert, a tightening device and an attachment separated from the basic body of the tool.
Figure 3:
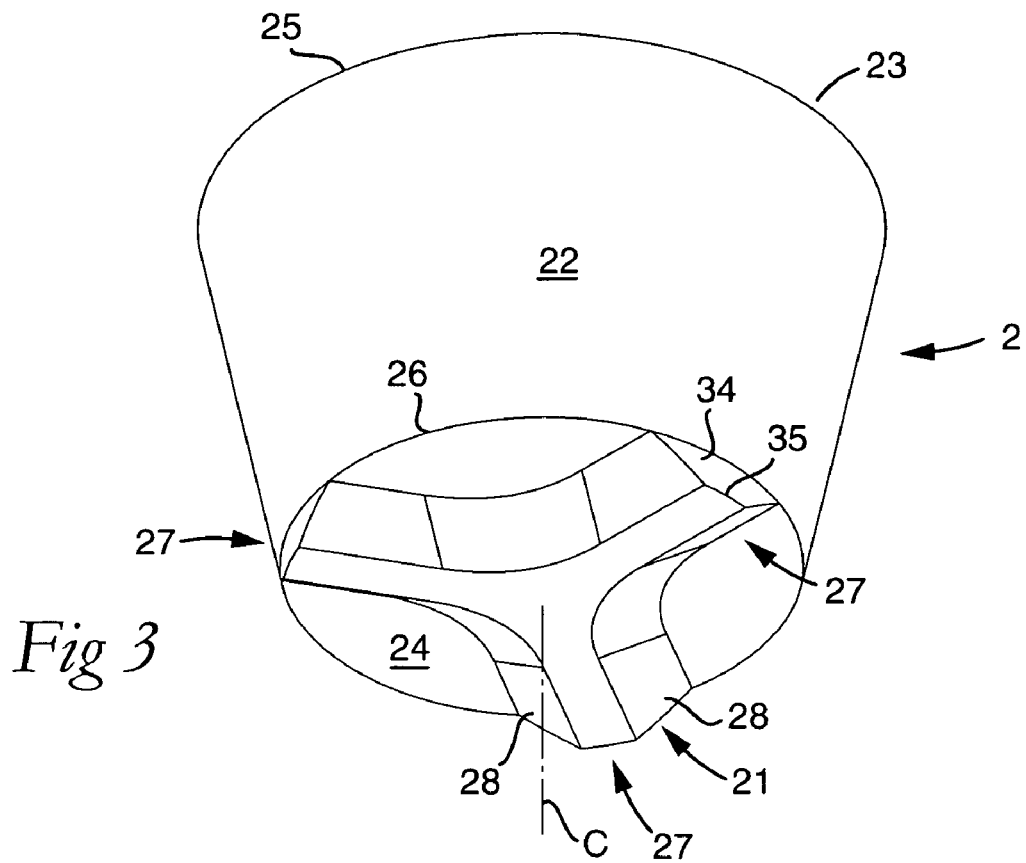
FIG. 3 is an enlarged perspective view of only the turning insert, more precisely as viewed obliquely from below.
Figure 4:
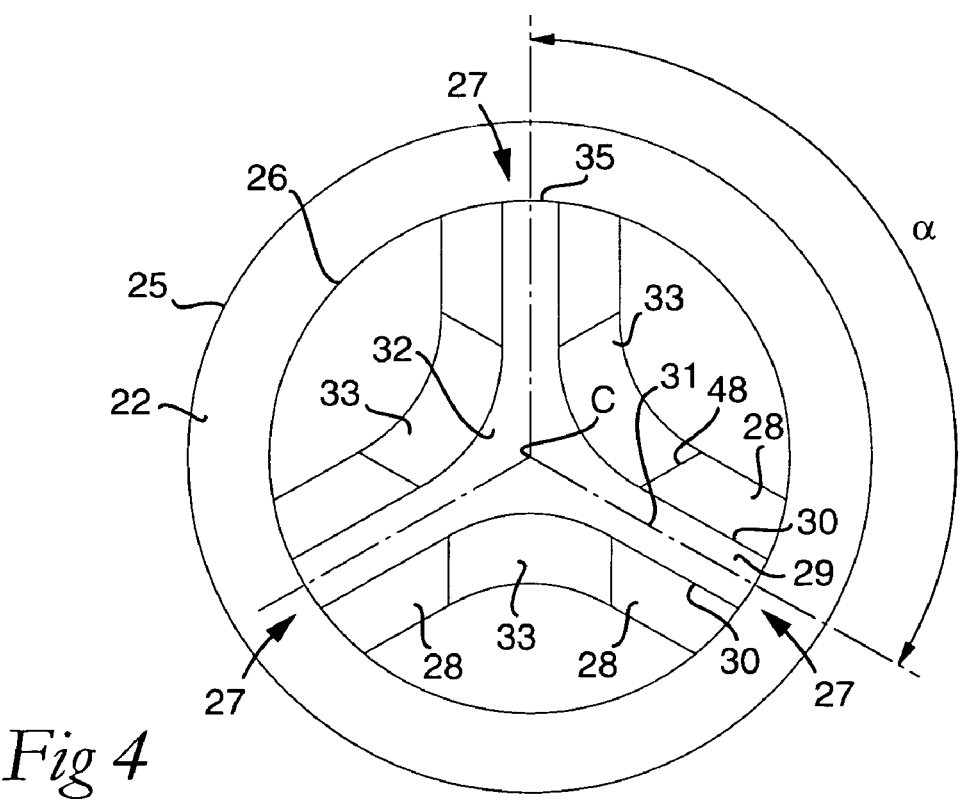
FIG. 4 is a planar view as viewed from below of the same turning insert.

In FIGS. 1 and 2, a turning tool made in accordance with the invention is illustrated, which comprises a basic body 1, a turning insert 2 and a device, in its entirety designated 3, for the clamping of the turning insert 2. An insert seat 4, in which the turning insert 2 can be placed, belongs to the basic body 1. This insert seat could, per se, be formed directly in the basic body, but in the shown, preferred embodiment, the insert seat 4 is formed in a separate attachment 5, which in turn is detachably connected to the basic body 1.

In the exemplified embodiment, the basic body 1, suitably made in one single piece, includes a rear fixing part 6, for instance of the type that is marketed under the trademark COROMANT CAPTO®, as well as a front, robust head 7. From the front surface of the head 7, a slender, cantilever-like bracket 8 projects, which has a height that is a several times greater than the thickness thereof. In this bracket, a lower step 9 is included against which the attachment 5 can rest. Upward from the step 9, a vertical contact surface 10 extends in which an oblong countersink 11 opens. In the bottom of the countersink, a threaded hole (not visible) mouths for the receipt of a screw 12 for the fixation of the attachment 5. As is clearly seen in FIG. 2, the generally elongate attachment 5 has a rear guide rail 13, which is insertable in the countersink 11 in order to rigidly anchor the attachment.

In a top surface 14 of the cantilever 8, a threaded hole 15 mouths. It should furthermore be noted that at the rear, the surface 14 transforms into a shoulder 16 having a limited height.

In the shown, preferred example, the turning insert 2 is solid, i.e., lacks holes, and therefore the tightening device 3 is in the form of a clamp, which can be clamped against the top side of the turning insert 2 by way of a screw 17, which can pass a through hole 18 and is tightened in the female thread in the hole 15. At the rear end thereof, the clamp 3 has a shoulder 19, which can rest against the shoulder 16. Because there is a certain distance between the hole 18 and the shoulder 19, a leverage is applied to the clamp 3 when the screw 17 is tightened. This means that a front nose 20 of the clamp is pressed by great force against the turning insert 2.

In the embodiment shown, the insert seat 4 is formed solely by a mechanical coupling element, which is arranged to cooperate with a complementary coupling element 21 on the underside of the turning insert 2. Henceforth, the reference designation 4 will therefore be used for the concept "insert seat" as well as the concept "coupling elements".

Before the features being vital to the invention are described more in detail, it should be emphasized that the concrete design of the basic body 1 is incidental. Thus, the turning insert could be applied in an insert seat of any shape of an expedient basic body, for instance a basic body of the type that is disclosed in U.S. Pat. No. 7,021,182, which is incorporated herein by reference. It should also be mentioned that the invention is generally applicable also to such turning inserts that are not clamped by way of precisely a clamp, although such clamping is preferred for at least small turning inserts. Thus, within the scope of the invention, it is feasible to fix the turning insert by way of a simple tightening screw, which is tightened via a hole in the turning insert.

As shown in FIGS. 3-8, solid turning insert 2 has a "round" basic shape. More precisely, the round shape is determined by an endless, rotationally symmetrical surface 22, which extends between a top side 23 and an underside 24. In the example, the surface 22 is conical and tapers in the direction of the underside 24, i.e., the turning insert is positive. The upper border line 25 in the transition between the clearance surface 22 and the top side 23 forms a cutting edge, which is endless and circular. In FIG. 2, the top side 23 is shown in the form of a simple, planar surface, since this surface lacks importance in connection with the invention. However, it should be pointed out that the surface in question might be formed with a variety of chip-breaking geometries.

The underside, designated 24, is generally a planar surface delimited by a peripherical, circular border line 26. In or on the surface 24, the coupling element, in its entirety designated 21, is formed. This coupling element comprises three engagement members 27 emanating radially from the center axis C of the turning insert, which members are equidistantly or equiangularly spaced-apart. In other words, the angle a between two adjacent engagement members amounts to 120°. In the example, the engagement members 27 are identical ridges, each one of which is delimited by two spaced-apart flank surfaces or flanks 28, which as a consequence of the male-like character of the ridge henceforth are denominated male flanks. Between the male flanks 28, a crest surface 29 extends, which advantageously—though not necessarily—is planar. Each such crest surface 29 is delimited by two mutually parallel border lines 30. The dash-dotted line 31, which is shown between these border lines 30, indicates an imaginary plane, extending axially through the turning insert, in the form of a central plane halfway between the border lines 30 and the male flanks 28. Here, it should be mentioned that the ridges are generally elongate so far that they have an extension along the central plane 31. However, in practice, they are of a moderate length.

In the embodiment shown, the three ridges 27 converge into a common, Y-shaped center piece 32. Although the design of the center piece 32 may vary, in the example, the same is delimited by extensions of the crest surfaces 31 of the ridges 27, as well as three concavely curved transition surfaces 33 between adjacent male flanks 28.

The free, outer end of each ridge 27 is delimited by a surface 34 that is partially rotationally symmetrical. The end surface 34 could, per se, be conical by extending in the extension of the cone surface 22. However, in the shown, preferred embodiment, the end surface 34 is instead partially cylindrical so far that the lower border line 35 of the surface has the same diameter as the border line 26. In such a way, it is guaranteed that the individual male flank 28 gets the largest possible contact area.

Figure 5:
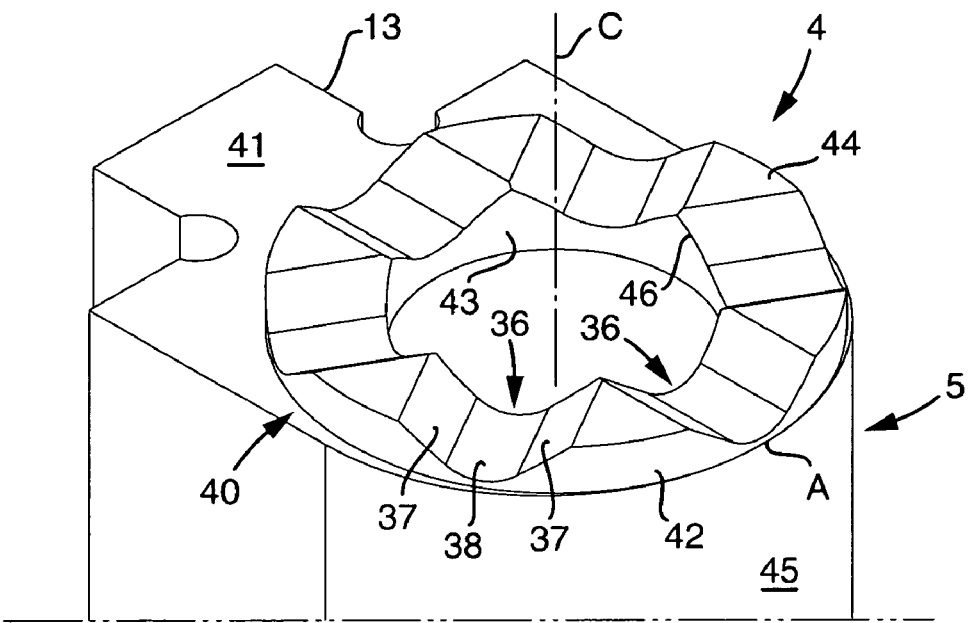
FIG. 5 is a perspective view of a part of an attachment, in which the insert seat of the basic body is included.
Figure 6:
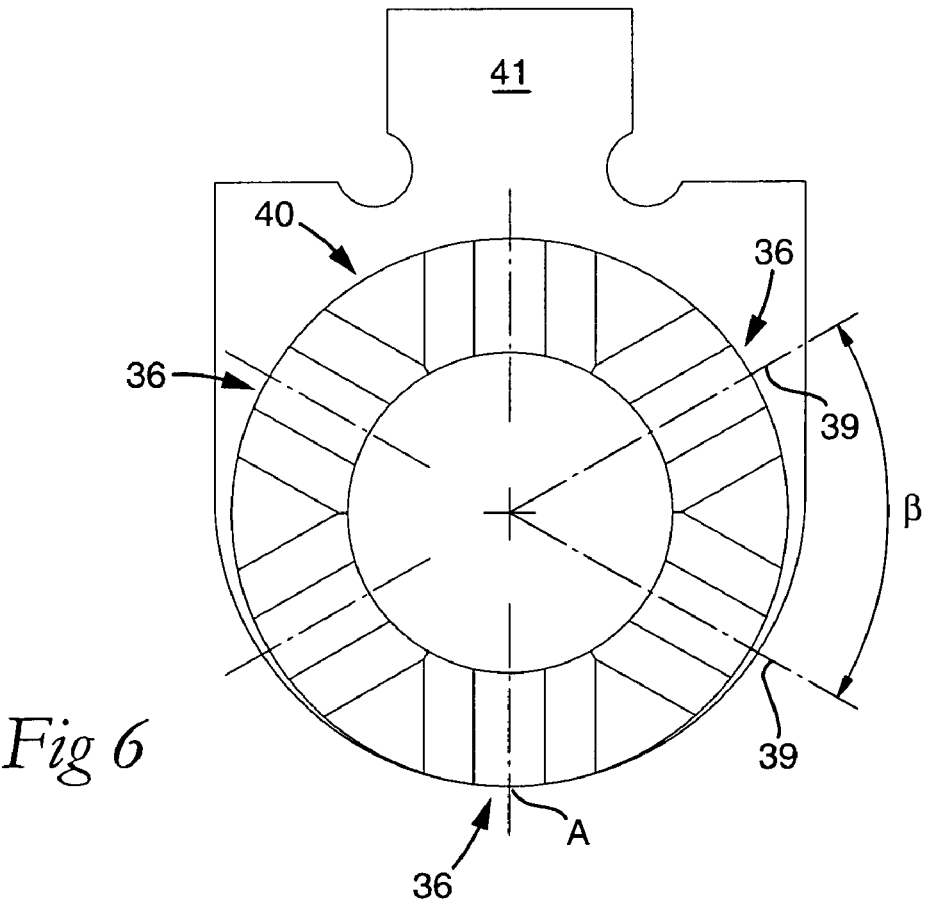
FIG. 6 is a planar view from above of the insert seat according to FIG. 5.

Reference is now made to FIGS. 5 and 6, which on an enlarged scale illustrate the design of the insert seat or the coupling elements 4. Like the coupling element 21, also the coupling element 4 is defined by a center axis, which has been designated C since it will coincide with the center axis of the turning insert when this is mounted. In analogy with the coupling element 21, the coupling element 4 includes a plurality of engagement members 36, which however, contrary to the male-like engagement members 27, are female-like. More precisely, the engagement members 36 are grooves or countersinks, which individually are delimited by a pair of female flanks 37 and a bottom surface 38 between the same. Within the scope of the general idea of the invention, the number of grooves 36 may be equal to the number of ridges 27, i.e., three. However, in accordance with the shown, preferred embodiment, the number of grooves is twice as large, i.e., six, the different grooves being equiangularly spaced-apart. In other words, the angle β between two adjacent grooves, such as these are represented by the central planes designated by the dash-dotted lines 39, amounts to 60°. The six grooves may also be regarded as two sets of grooves, each one of the two sets having three equiangularly spaced-apart grooves, i.e., the angle between two adjacent grooves in such a set amounts to 120°. Thus, in this example, the two sets of grooves are angularly displaced 60° in relation to each other.

The grooves 36 are formed in a ring-shaped material portion designated 40, which below is denominated ring and which rises above the top surface 41, being planar as to the rest, of the attachment part 5. The ring 40 is delimited by outer and inner, rotationally symmetrical surfaces 42, 43, as well as a top surface, which is represented by six sector-shaped or wedge-shaped part surfaces 44, which are situated in a common plane (which may be parallel to the top surface 41). It should be noted that the ring 40 in point A is situated very close to, or is tangent to, the curved surface 45 that forms a front surface of the attachment 5. To a person skilled in the art, it should be evident that the active part of the cutting edge 25 of the turning insert is indexed up to point A, when the tool is going to operate.

Reference is now made to FIGS. 7 and 8, which illustrate an important feature of the invention, viz. that the angle γ between the male flanks 28 as well as the angle δ between the female flanks 37 are obtuse. Theoretically, the angles γ, δ may be exactly equal and amount to at least 90°. In the example, the angles amount to 120°. However, in practice, the angle γ, which is the flank angle of the ridges 27 made from hard material, may nominally be made somewhat (some minute) larger than the flank angle δ of the grooves 36 made from a softer material. Therefore, when the individual ridge 27 is brought into engagement with the appurtenant groove 36, it is guaranteed that the male flanks 28 initially get surface contact with the female flanks 37 along the upper portions thereof, after which the contact successively increases by coining of the material in the female flanks.

In FIG. 8, it is seen that the individual ridge, in a known way per se, does not bottom in the appurtenant groove, i.e., the crest surface 29 of the ridge does not contact the concavely curved bottom surface 38 of the groove. Furthermore, the height of the ridge is adapted in such a way in relation to the depth of the groove that the lower surface 24 of the turning insert does not contact the part surfaces 44 of the ring 40 that surround the individual groove.

In FIG. 7, it is seen that the individual ridge is symmetrical in respect of the central plane 31, i.e., the male flanks are situated at equal distances from the central plane 31 and are inclined at equal angles ε in relation to the same. Hence, the angle ε is half as large as the angle γ.

Figure 9:
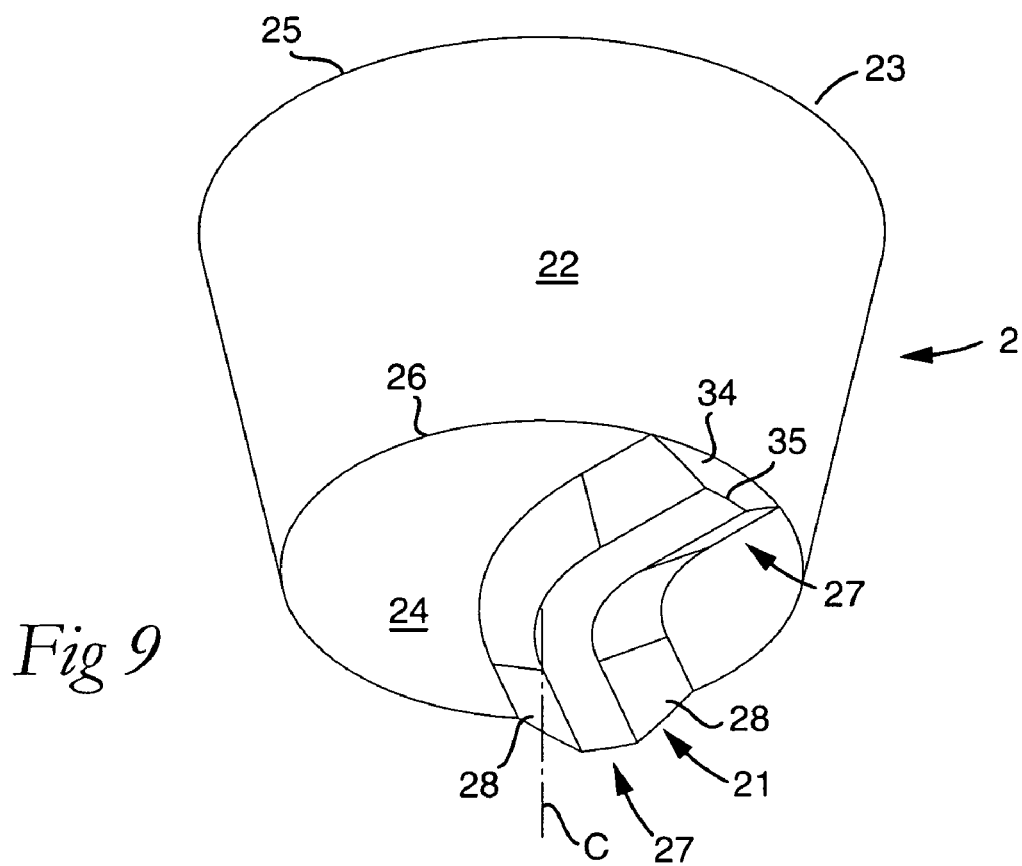
FIG. 9 is an enlarged perspective view, obliquely from below, of an alternative embodiment of a turning insert according to the invention.
Figure 10:
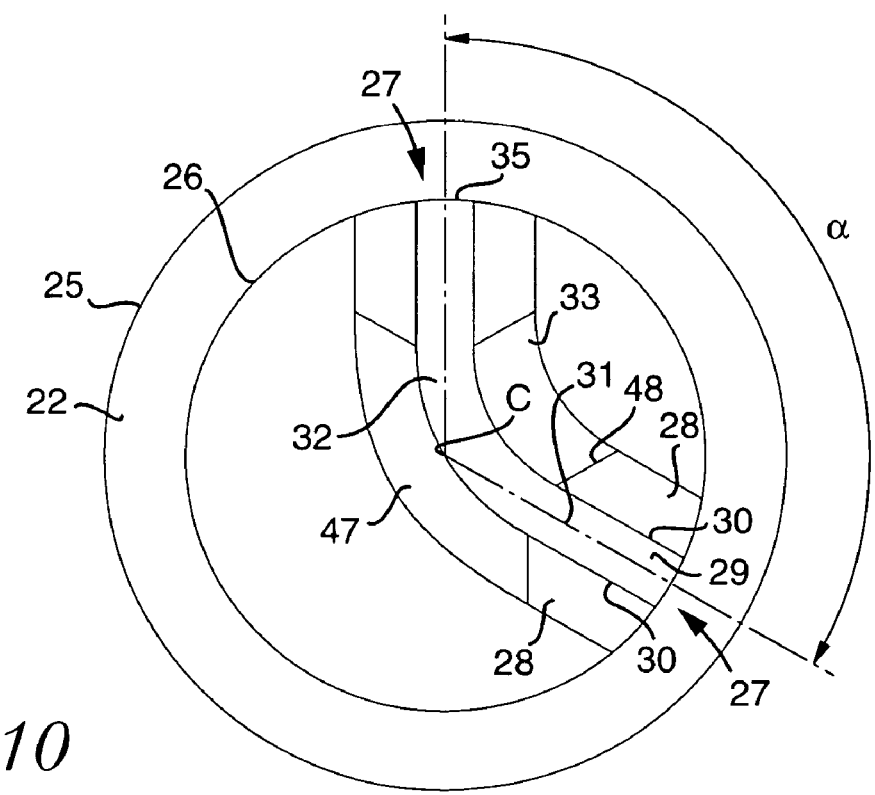
FIG. 10 is a planar view as viewed from below of the turning insert according to FIG. 9.

In conclusion, reference is made to FIGS. 9 and 10, which illustrate an alternative embodiment of a turning insert 2 in accordance with the present invention. The turning insert 2 illustrated in FIGS. 9 and 10 has great similarities to the turning insert illustrated in FIGS. 1-4 and described above, and therefore the same reference designations are used for the same features. In essence, the only difference between the turning insert 2 according to FIGS. 9-10 and the turning insert 2 according to FIGS. 1-4 is that the coupling element of the former, which in its entirety is designated 21, only has two engagement members 27 emanating radially from the center axis C of the turning insert, which members form an angle different from 180°. In the example illustrated in FIGS. 9-10, this angle a is obtuse and amounts to 120°. In other words, the engagement members of the turning insert 2 form the same angle a as two of the three equiangularly spaced-apart engagement members 36 in the coupling element 4 of the insert seat. Furthermore, the engagement members of the turning insert 2 are identical ridges 27, each one of which is delimited by two spaced-apart flank surfaces or flanks 28, between which a crest surface 29 extends.

In the example illustrated in FIGS. 9-10, the two ridges 27 converge into a common, arched or V-shaped center piece 32, which is delimited by extensions of the crest surfaces 29 of the ridges 27, as well as two curved transition surfaces 33, 47, each one of which connects two flanks 28. One of the transition surfaces 33 is concave and connects the two adjacent flanks 28 of the ridges 27, while the other transition surface 47 is convex and connects the two other flanks 28 of the ridges 27.

During practical work with the described turning tool, the attachment 5 as well as the clamp 3 are permanently connected to the basic body 1 by way of the screws 12, 17, while on the other hand the turning insert 2 frequently is exchanged. When a turning insert is to be exchanged, the screw 17 is loosened, without being removed from the basic body though, and then the turning insert is removed and replaced by a new turning insert, which is inserted in the space between the nose 20 of the clamp and the insert seat 4.

In the turning insert 2 according to FIGS. 1-4, the ridges 27 in the coupling elements 21 of the turning insert 2 will engage three of the six grooves 36. More precisely, one of the ridges 27 will be located in the front groove 36 adjacent to point A (see FIG. 5), while the two other ridges are located in the two rear grooves that extend at an angle of 120° to the front groove. When the tightening screw 17 finally is tightened, the three ridges will be rigidly anchored in the appurtenant grooves by the fact that all (six) male flanks contact all (six) female flanks. By the fact that the ridges and the grooves, respectively, are equiangularly spaced-apart, the turning insert obtains an extraordinarily stable three-point support of the same reliable character as the support of a three-legged chair. Furthermore, the turning insert self-centers, in that the co-operating male and female flanks compulsory bring the turning insert into a position in which the center axis of the turning insert coincides with the center axis of the insert seat, when the ridges are pressed into the appurtenant grooves.

In the case of the alternative turning insert 2 according to FIGS. 9-10, the two ridges 27 in the coupling element 21 of the turning insert 2 will engage two of the six grooves 36. One of the ridges 27 will be located in a first groove 36, while the other ridge will be located in another groove that extends at an angle of 120° to the first groove. When the tightening screw 17 finally is tightened, these two ridges will be rigidly anchored in the appurtenant grooves by the fact that all (four) male flanks contact the appurtenant (four) female flanks. This turning insert 2 gets a three-point support by the anchorage of the two ridges in two grooves together with the abutment of the underside 24 of the turning insert 2 against one or more, for instance two, wedge-shaped part surfaces 44 in the insert seat 4.

When the turning insert 2 has been fixed, turning follows. If this is carried out at a small cutting depth, the wear of the edge 25 of the turning insert can be limited to an arc length that is smaller than 60° of the total arc length of 360°. When such an edge portion has been consumed, indexing takes place, viz. by the fact that the screw 17 is loosened (without being removed) so that the turning insert 2 may be lifted a distance and be rotated 60° in order to locate an unconsumed edge portion in point A. Thanks to the existence of six grooves in the insert seat 4, such an indexing may be carried out as much as six times. In other words, approximately the entire cutting edge can be utilized before the turning insert has to be discarded. If turning is carried out at greater cutting depths, the number of possible indexings is of course reduced, for instance to three.

A primary advantage of the invention, such as this is represented by the interface between the turning insert and the insert seat, is that the engagement members co-operating with each other are obtuse-angled, i.e., the flanks of each pair of flanks form an obtuse angle with each other. In such a way, the projection surfaces of the flanks in a plane perpendicular to the center axis become considerably larger than analogous projection surfaces of acute-angled engagement members. In turn, this entails that the capacity of the insert seat to carry such tangential forces from the workpiece that propagate in the axial direction of the turning insert (i.e., from the top side to the underside) becomes satisfactory. Another advantage, in comparison with previously known turning inserts, is that the number of possible indexings of, for instance, round turning inserts, increases. This is in particular the case when one of the coupling elements is formed with six engagement members. Furthermore, the invention offers new possibilities of manufacturing round turning inserts having a minimal diameter, viz. by making the turning insert solid (i.e., without holes) and fixing the same by way of a clamp, the described interface guaranteeing utmost good stability and positional accuracy.

It deserves to be pointed out that the diameter of the imaginary cylinder that defines the end surfaces 34 of the ridges 27, advantageously may be somewhat greater than the diameter of the external, cylindrical or rotationally symmetrical surface 42 that delimits the ring 40. Even if this difference in diameter may be as small as 0.005-0.05 mm, it is guaranteed, however, that the very outermost portions of the male flanks 28 protrude some thousandths or hundredths of a millimeter in relation to the outermost end portions of the female flanks 37. In such a way, it is avoided that the male flanks coin the female flanks in a harmful way.

In an analogous way, the inner ends of the male flanks (refer to turning line 48 in FIG. 4) may be located somewhat inside the inner ends of the female flanks 37 adjacent to the internal cylinder surface 43 (refer to turning line 46 in FIG. 5).

Although the obtuse angle ($\gamma$ and $\delta$, respectively) in the described and shown embodiment amounts to 120°, the same may vary upward as well as downward from the value. However, in practice, the obtuse angle should amount to at least 95° and at most 150°, suitably at least 110° and suitably at most 130°.

The invention is not limited to the embodiment described above and shown in the drawings. Even if the invention is particularly well applicable in connection with round turning inserts, the same may also be applied to other turning inserts having symmetrical basic shape, for example triangular or hexagonal. Furthermore, the invention may be applied to turning inserts that are fixed by way of other tightening devices than precisely a clamp, for example holed turning inserts that are fixed by way of a simple tightening screw. However, for small turning inserts, the shown, solid embodiment is preferred, in which clamping is carried out by way of a clamp. Furthermore, it is feasible to form the coupling element that forms an insert seat directly in the material included in the basic body. However, in many applications, the shown embodiment is preferred, in which the coupling element is formed in a separate exchangeable attachment. An advantage of this embodiment is that the attachment can be replaced readily by a new attachment, if the insert seat would become damaged in connection with possible insert breakdowns. Another conceivable possibility of forming the interface between the turning insert and the basic body/the attachment is to make the engagement members of the turning insert in the form of grooves for the engagement with complementary ridges in the insert seat. However, in normal cases, the embodiment described above is preferred, in which the risk of bursting or splitting of the turning insert is minimal.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A turning tool, comprising:
a basic body having an insert seat defined by a center axis;
a turning insert detachably mounted in the insert seat, said turning insert being indexable and having, about the center axis, a symmetrical basic shape that is determined by a clearance surface extending between a top side and an underside, said turning insert including a chip-removing cutting edge adjacent to the top side;
said turning insert including coupling means formed in the underside, said coupling means including an elongate engagement member having a pair of spaced-apart flanks which are inclined relative to each other at a certain angle in a cross-sectional plane being perpendicular to a length extension of the engagement member, said coupling means of the turning insert mechanically engaging a complementary coupling means that forms the insert seat of the basic body and likewise includes an elongate engagement member having a pair of spaced-apart flanks which are inclined relative to each other at an angle as viewed in a cross-sectional plane being perpendicular to a length extension thereof;
wherein a first one of the two coupling means comprises three radially extending and equiangularly spaced-apart engagement members; and the second one of the two coupling means comprises at least two engagement members extending radially from the center axis and forming the same angle as two of the three engagement members of the first coupling means as viewed towards a plane view being perpendicular to the center axis, wherein the angle between the pairs of flanks of each individual engagement member is obtuse.

2. The turning tool according to claim 1, wherein each one of the two coupling means comprises three equiangularly spaced-apart engagement members emanating radially from the center axis, the pairs of flanks of said engagement members forming an obtuse angle with each other.

3. The turning tool according to claim 1, wherein a number of engagement members in one of the coupling means is twice as large as a number of engagement members in the other coupling means.

4. The turning tool according to claim 1, wherein the engagement members in the coupling means that forms the insert seat are grooves, while the engagement members included in the coupling means of the turning insert are ridges.

5. The turning tool according to claim 4, wherein a number of ridges in the coupling means of the turning insert amounts to three, and a number of grooves in the insert seat to six.

6. The turning tool according to claim 1, wherein the coupling means that forms the insert seat is a part of an attachment detachably connected to the basic body.

7. The turning tool according to claim 1, wherein the turning insert has a round basic shape by being delimited by a rotationally symmetrical clearance surface.

8. The turning tool according to claim 1, wherein the turning insert is solid and fixed in the insert seat by means of a clamp.

9. An indexable turning insert, comprising:
a symmetrical basic shape around a center axis that is defined by a clearance surface extending between a top side and an underside;
a chip-removing cutting edge disposed adjacent to the top side;
coupling means located to the underside, said coupling means comprising an elongate engagement member having a pair of spaced-apart flanks which are inclined relative to each other at a certain angle as viewed in a cross-sectional plane being perpendicular to a length extension of the engagement member, wherein the coupling means comprises at least two engagement members extending radially from the center axis and forming an angle different from 180°;

wherein the angle between the pairs of flanks of each individual engagement member when viewed in the cross-sectional plane is obtuse.

10. The turning insert according to claim 9, wherein the coupling means comprises three equiangularly spaced-apart engagement members emanating radially from the center axis, the pairs of flanks of which members form an obtuse angle with each other.

11. The turning insert according to claim 9, wherein the obtuse angle between a pair of flanks amounts to at least 95° and at most 150°.

12. The turning insert according to claim 9, wherein the engagement members are ridges and the flanks are in the form of two male flanks facing away from each other.

13. The turning insert according to claim 12, wherein the ridges converge into a common center piece.

14. The turning insert according to claim 13, wherein the common center piece is Y-shaped.

15. The turning insert according to claim 9, wherein the turning insert is solid, so far that the turning insert lacks holes.

16. The turning insert according to claim 9, wherein the turning insert has a round basic shape defined by a rotationally symmetrical clearance surface.

17. The turning insert according to claim 16, wherein the clearance surface is conical and converges in a direction of said underside.

18. The turning insert according to claim 17, wherein the ridges are equally high and extend up to the conical clearance surface, where the ridges end in partially cylindrical end surfaces.

19. The turning insert according to claim 12, wherein an individual ridge has a cross section shape that is symmetrical in respect of an imaginary, central longitudinal plane, which extends in the axial direction of the turning insert and intersects the center axis.

20. The turning insert according to claim 19, wherein two male flanks of the ridge are equidistantly retreated from the longitudinal plane, and form equal angles of at least 45° with the same.

21. A turning tool, comprising:
a basic body having an insert seat defined by a center axis;
a turning insert detachably mountable in the insert seat, said turning insert being indexable and having, about the center axis, a symmetrical basic shape that is determined by a clearance surface extending between a top side and an underside, said turning insert including a chip-removing cutting edge adjacent to the top side;
said turning insert including coupling means formed in the underside, said coupling means including an elongate engagement member having a pair of spaced-apart flanks which extend outwardly from said underside in the same direction as said center axis, said spaced apart flanks are inclined toward a line parallel to a direction of the center axis while forming an obtuse angle with each other in a plane that is perpendicular to said center axis, said coupling means of the turning insert mechanically engaging a complementary coupling means that forms the insert seat of the basic body;
wherein one of the two coupling means comprises three equiangularly spaced-apart engagement members extending radially from the center axis; and said other of the two coupling means comprises at least two engagement members extending radially from the center axis and forming a same angle as two of the three engagement members of said one of the coupling means, wherein pairs of flanks of each individual engagement member form an obtuse angle with each other in a plane that is perpendicular to said center axis.

22. The turning tool according to claim 21, wherein each one of the two coupling means comprises three equiangularly spaced-apart engagement members emanating radially from the center axis, the pairs of flanks of said engagement members forming an obtuse angle with each other.

23. The turning tool according to claim 21, wherein a number of engagement members in one of the coupling means is twice as large as a number of engagement members in the other coupling means.

24. The turning tool according to claim 21, wherein the engagement members in the coupling means that forms the insert seat are grooves, while the engagement members included in the coupling means of the turning insert are ridges.

25. The turning tool according to claim 24, wherein a number of ridges in the coupling means of the turning insert amounts to three, and a number of grooves in the insert seat to six.

26. The turning tool according to claim 21, wherein the coupling means that forms the insert seat is a part of an attachment detachably connected to the basic body.

27. The turning tool according to claim 21, wherein the turning insert has a round basic shape by being delimited by a rotationally symmetrical clearance surface.

28. The turning tool according to claim 21, wherein the turning insert is solid and fixed in the insert seat by means of a clamp.

* * * * *